May 19, 1970

J. F. WIRLEY ET AL 3,512,886

DUAL CARRIAGE SCANNING SYSTEM

Filed Oct. 23, 1967

INVENTORS
ROBERT A. SCHAEFFER
JOHN F. WIRLEY
BY

ATTORNEYS

May 19, 1970　　　　J. F. WIRLEY ET AL　　　　3,512,886
DUAL CARRIAGE SCANNING SYSTEM
Filed Oct. 23, 1967　　　　　　　　　　　　　　4 Sheets-Sheet 3

INVENTORS
ROBERT A. SCHAEFFER
JOHN F. WIRLEY

BY
ATTORNEYS

May 19, 1970      J. F. WIRLEY ET AL      3,512,886

DUAL CARRIAGE SCANNING SYSTEM

Filed Oct. 23, 1967      4 Sheets-Sheet 4

INVENTORS
ROBERT A. SCHAEFFER
JOHN F. WIRLEY

BY

ATTORNEYS

United States Patent Office 3,512,886
Patented May 19, 1970

3,512,886
DUAL CARRIAGE SCANNING SYSTEM
John F. Wirley, Webster, and Robert A. Schaeffer, Rochester, N.Y., assignors to Xerox Corporation, Rochester, N.Y., a corporation of New York
Filed Oct. 23, 1967, Ser. No. 677,355
Int. Cl. G03b 27/54
U.S. Cl. 355—70                                    6 Claims

ABSTRACT OF THE DISCLOSURE

A moving optical scanning apparatus for placing a flowing light image of a stationary object on a moving photosensitive surface. Moving light sources are arranged in such a manner that the light sources begin and terminate a scanning pass at the same position thereby eliminating the need to reposition said light sources after each scanning pass.

---

This invention relates in general to optical scanning apparatus and, in particular, to scanning apparatus for projecting a light image onto a moving photosensitive surface.

More specifically, this invention relates to apparatus for projecting a light image of an original document onto a moving xerographic photoconductive surface. In the process of xerography, a plate, comprising a conductive backing upon which is placed a photoconductive insulating material, is charged uniformly and the photoconductive surface exposed to a light image of the original document to be reproduced. The photoconductive coating is caused to become conductive under the influence of the light image so as to selectively dissipate the electrostatic charge found thereon to produce what is known as a latent electrostatic image. The latent image is then developed by means of a variety of pigmented resins which have been developed specifically for this purpose. The pigmented resins, or, as commonly referred to, "toners" are electrostatically attracted to the latent image on the photoconductive surface in proportion to the amount of charge found thereon. That is, a charge of small concentration becomes an area of low toner density while an area of greater charge concentration becomes proportionally more dense.

Generally, in automatic xerographic apparatus, a moving photoconductive surface capable of being passed continually through the various xerographic processes as for example a drum, is employed. A convenient method of forming a latent image on a moving drum surface is by means of a moving optical scanning apparatus in which a light source and a lens element are moved in timed relation with the drum surface to produce a flowing image of a stationary original document thereon. The lens projects successive elemental areas of illumination on the fixed original onto the moving drum surface to produce a latent image of the original capable of being xerographically reproduced. Such a moving optical scanning apparatus is disclosed in Rutkus, U.S. Pat. No. 3,062,095.

A moving optical scanning apparatus as disclosed by Rutkus, in which the original document is supported on a stationary platen, has been found to have certain advantages over fixed optical scanning devices. In the latter type system, scanning is accomplished by moving the original document past a fixed optical system by means of mechanical transport systems such as gripper bars. Bulky original documents, as for example books, which are readily supported on a stationary viewing platform, are extremely difficult to handle on a moving transport. Furthermore, there is little or no danger of an original document being damaged or destroyed when the original document is positioned on a stationary platen or the like while, on the other hand, originals that are engaged by gripper bars or other moving mechanical means are susceptible to damage in the event of a system's malfunction.

With the advent of new photoreceptor materials and new xerographic reproducing techniques, automatic xerographic apparatus capable of producing high quality images, at extremely high rates, are now quite feasible. However, it has been found that to produce a high quality image, that is, an image of high resolution, on a xerographic plate, the original document must be uniformly illuminated throughout the scanning cycle in order to discharge the xerographic plate in proportion to the optical density of the original document. In most conventional optical scanning apparatus, such as the Rutkus device, a single moving light source is used to illuminate the original document. However, because of the geometry of the system and the characteristics of most projection lenses, the illumination so produced by the single light source during the scanning pass is far from uniform. The intensity of illumination produced at the center of the document is found to be higher than the illumination produced at the edges. This non-uniformity of illumination directly effects the quality of the image produced and therefore severely limits the xerographic apparatus regardless of the plate response or reproduction techniques employed.

A singe moving light source must be returned to its starting position after each scanning pass in an automatic apparatus. It has been found, that rapidly returing a relatively massive lamp carriage, as required in a high speed apparatus, sets up unwanted vibrations in the xerographic machine because of the dynamics of the forces and motions involved. These vibrations often times are of a magnitude sufficient to disturb the various xerographic processing steps and are reflected by a degradation of the copy reproduced.

It is therefore a primary object of this invention to improve apparatus for placing a flowing image on a photosensitive surface.

A further object of this invention is to improve moving optical scanning apparatus for placing a light image on a moving photosensitive surface.

Another object of this invention is to reduce vibrations found in a moving optical scanning apparatus.

A still further object of this invention is to provide apparatus for uniformly illuminating successive elemental areas on an original doucment as the document is scanned in a moving optical scanning system.

Another object of this invention is to improve moving optical scanning apparatus for use in high speed xerographic reproduction apparatus.

Yet another object of this invention is to eliminate unwanted vibrations in high speed automatic xerographic reproduction apparatus.

A still further object of this invention is to provide a moving optical scanning apparatus for rapidly placing a flowing light image on a moving xerographic drum.

Yet another object of this invention is to improve the uniform quality of copy produced on an automatic xerographic machine.

A still further object of this invention is to improve the uniformity of illumination in a moving optical scanning apparatus.

And yet another object of this invention is to improve xerographic reproduction apparatus so it is capable of scanning bulky and non-deformable objects at relatively high speeds.

These and other objects of the present invention are attained by means of a stationary support platen for supporting an original document therein, the platen being illuminated by means of two movable light sources which are arranged to move towards and away from each other in timed relation from opposite ends of the platen towards the center thereof and are arranged in light projecting relation with a photosensitive surface such as a moving xerographic drum, a slit aperture extending transversely to the path of movement of said photosensitive surface to permit reflected light from the platen to be directed onto a portion of said moving surface, a movable lens element positioned in the optical path between the platen and the photosensitive surface and arranged to move in a path transverse to the optical image plane of the platen, drive means to move the lens element and the two light sources in timed relation whereby the lens continually scans between the two light sources, and control means adapted to control the movement of the light sources in relation to the lens element so that the lens element continually projects successive elemental areas of uniform illumination as it scans across an original document supported in the stationary platen and means to return the lens element after each scanning pass.

For a better understanding of the invention as well as other objects and further features thereof, reference is had to the following detailed description of the invention to be read in connection with the accompanying drawings, wherein.

Figure 1:
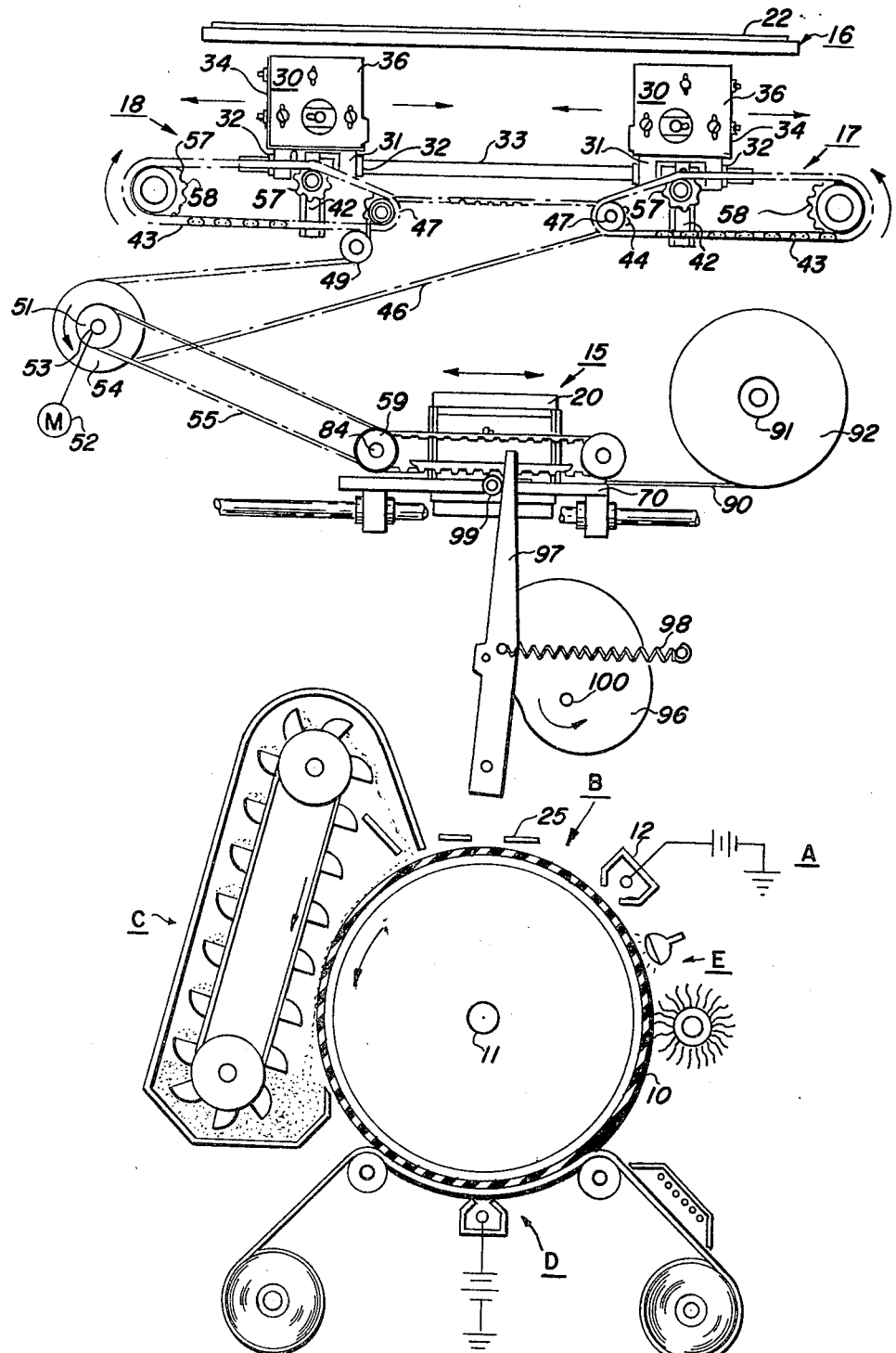
FIG. 1 illustrates schematically a preferred embodiment of the scanning apparatus of the instant invention adapted for continuous use in an automatic xerographic machine.

Although the instant invention is well adapted for use in any suitable facsimile or reproduction apparatus, it is shown herein embodied in a xerographic apparatus for purposes of illustration. There is shown a general arrangement of the scanning apparatus within an automatic reproduction machine in FIG. 1. A drum 10 is mounted on shaft 11 and the shaft rotatably supported in the side frames of the machine (not shown). The major xerographic processing components are mounted around the drum so that they are able to act thereon as the drum is continually rotated through the various stations.

In general, the several xerographic processing stations in the path of movement of the drum surface may be described functionally as follows:

A charging station A, at which a uniform electrostatic charge is deposited on the photoconductive drum surface;

An exposure station B, at which a light or radiation pattern of a copy to be reproduced is projected onto the xerographic plate to dissipate the charge in the exposed areas to form thereon a latent electrostatic image of the copy to be reproduced;

A development station C, at which the xerographic developing material, including toner particles having an electrostatic charge opposite to that of the electrostatic latent image, are cascaded over the plate surface whereby the toner particles are caused to adhere to the electrostatic latent image to form a toner powder image in the configuration of the copy being reproduced;

A transfer station D, where the toner powder image is electrostatically transferred from the plate surface to a final support material;

A drum cleaning and discharge station E, at which the plate surface is brushed to remove residual toner particles remaining thereon after image transfer and at which time the plate surface is exposed to a relatively intense light source to effect substantially complete discharge of any residual electrostatic charge remaining thereon.

In general, the electrostatic charging of the xerographic drum in preparation to the exposure step is accomplished by means of a corona generating device whereby an electrostatic charge on the order of 500 to 1000 volts is applied uniformly to the drum surface. Although any number of types of corona generators may be used, a device of the type disclosed by Vyverberg in Pat. No. 2,836,725 is used for corona charging device numerically referred to as 12. The corona charging device, or as herein referred to, corotron, is securely affixed to the machine frame and operatively connected to any suitable electric source. As the drum rotates in the direction indicated (FIG. 1), the photoconductive surface passing under corotron 12 is uniformly charged and then passed to the exposure station where a flowing light image of an original subject to be reproduced is used to discharge the photosensitive drum in the non-image areas thus creating a latent image capable of being xerographically processed as described above.

A latent image is formed on moving drum 10 by projecting a reflected light image of an original object 22 supported on stationary flat platen 16 onto the drum surface by means of moving lens assembly 15. The lens assembly moves in a horizontal direction from right to left (FIG. 1) as it scans the original object on the platen. The lens assembly, moving in timed relation with the drum surface, projects successive light images of elemental areas on the original document onto the drum surface. The light images cause the precharged photoconductive surface to become discharged in the light areas thereby producing a latent image. At the end of the scanning pass the lens element is rapidly returned to the starting position preparatory to commencing another scanning pass.

Two movable lamp assemblies, 17 and 18, respectively, are employed to illuminate the original document found on the stationary platen. The lamp assemblies are arranged to begin each copying cycle at their individual starting positions located at opposite ends of platen 16 and to move towards and then away from each other in a horizontal plane below the platen. The individual lamp assemblies reciprocate in a horizontal direction from their respective starting positions to fully extended positions near the center of the platen and then back during the time period that the lens makes one scanning pass across the platen. As will be explained in greater detail below, the lamp assemblies are arranged to move so that the lens assembly continually scans therebetween during a scanning pass. Furthermore, the movement of the lamps and the lens are coordinated so that the lens continually projects light images from successive areas of uniform light intensity on the platen.

The optical apparatus of the instant invention may be used for the reproduction of the same size of copy or for larger or smaller reproductions thereof. When a one-to-one reproduction is to be made, the lens is positioned optically equi-distance from both the copy and the moving photoconductive surface. When smaller or reduced size reproductions are desired, the lens may be positioned optically closer to the xerographic drum than to the copy and, obviously, the opposite arrangement may be made when a larger reproduction is desired.

In this particular embodiment, a one-to-one reproduction arrangement is disclosed. The lens element is positioned midpoint in the optical path between the platen surface and the xerographic drum with the lens element being adapted to move back and forth along path of travel having a distance at least one half of the copy at a speed equal to one half the linear surface speed of the drum. All movements of the lens element and lamp assemblies are centered about the center line of platen 16. Although, the center line of the platen, as shown in FIG. 1, is also coaxially aligned with the center line of the xerographic drum 10, however, it should be clear that a folded optical path could be substituted for the straight optical path as shown herein.

Referring now to FIGS. 1 through 4, the apparatus of the present invention will be explained in further detail. The two individual movable lamp assemblies 17 and 18 are arranged symmetrically about the center line of platen 16. As shown in FIG. 1, identical lamp carriages 30 are employed in both assemblies and are securely affixed at one end to T-shaped drive member 31. Two linear bushings 32 are pressed into the T-shaped drive member and arranged to ride along guide rails 33. Z-shaped bracket 60 is affixed to the opposite end of the lamp carriage (FIG. 2) and roller 61 rotatably supports therein. Roller 61 is arranged to ride upon rectangular support rail 62 which is securely mounted in the machine frame. As can be seen, the two individual lamp carriages are both adapted to ride along the same guide rail 33 and the same support rail 62, the rails being arranged so that the path of travel traversed by the lamp carriages is substantially parallel to the surface of the support plates.

The individual lamp carriages are substantially formed of an L-shaped housing 34 having affixed to each end thereon end plates 36. Electrical adapters 37 and 38, respectively (FIG. 2), are permanently mounted in the end plates, as for example by means of screws, and are adapted to receive and support aperture lamps 40 therebetween. Two elongated aperture lamps, such as fluorescent lamps, are supported in each lamp carriage and extend transverse to the path of travel of the carriages. The lamps are further arranged to be supported in the lamp carriages so that the elongated slot apertures therein are positioned to focus a single band of light on the platen. That is, peak illumination is produced at a single point on the original by each lamp carriage.

Each individual lamp carriage is driven by means of chain 43 acting through drive pin 41 securely locked thereon. The drive pin and chain are arranged in the assembly so that the pin rides freely in slot 42 provided in the T-shaped drive member 31.

Figure 2:
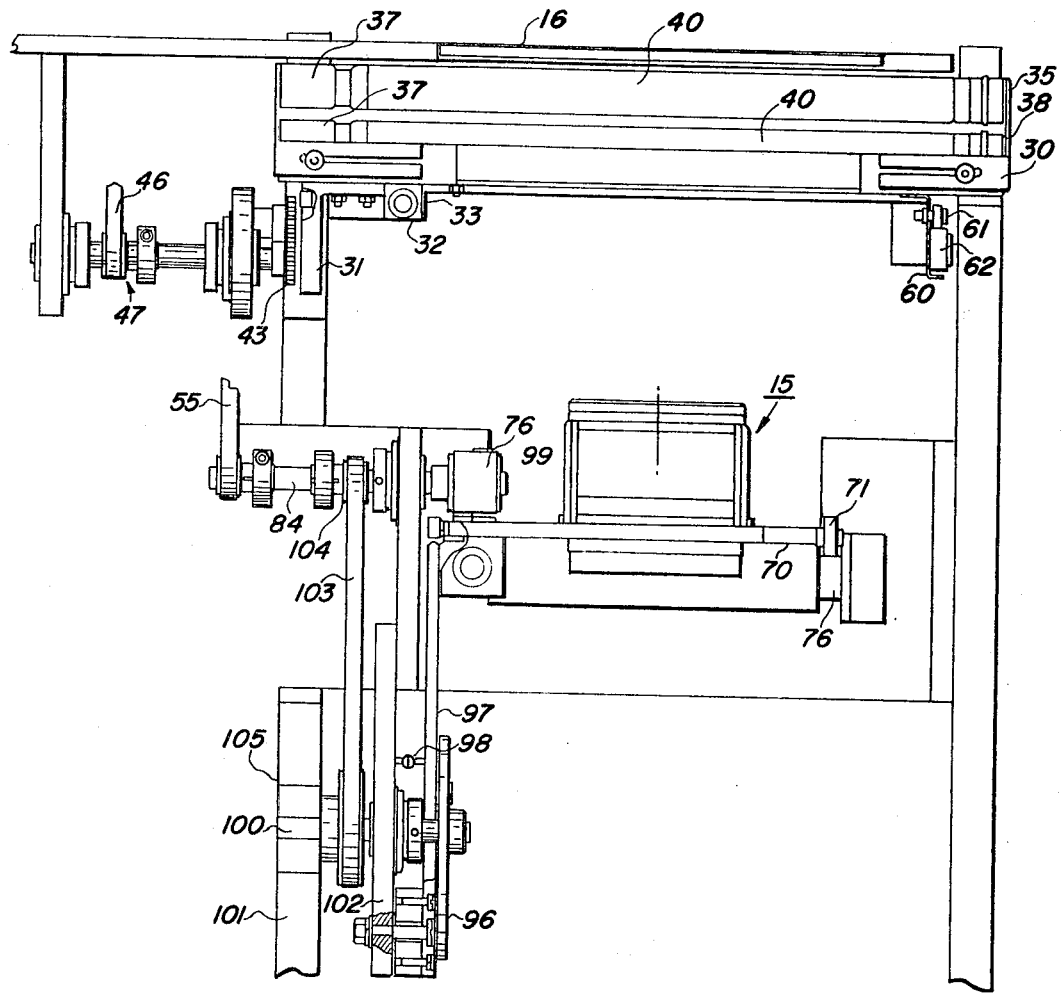
FIG. 2 is a right-hand partial perspective view of an optical scanning mechanism in accordance with the invention.

Drive sprocket 44, which is pinned to drive shaft 45, is driven a predetermined constant velocity by means of timing belt 46 acting through timing pulley 47 (FIGS. 1 and 2). As shown, the drive chains associated with each of the lamp carriage assemblies pass over idler sprockets 57 and 58 causing the drive pin, which is secured at one end in the chain, to travel an irregular path during each scanning pass. The individual lamp carriages are confined to travel in a horizontal direction by the guide rail and therefore any change in the vertical position of the drive pin during a scanning cycle will be reflected in a change in horizontal velocity of the lamp carriage.

The lens assembly 15 comprises a lens carriage 70 in which the lens element 20 is securely mounted as by means of mounting brackets or the like. Two embossed sections 73 on the carriage have pressed therein linear bearings 74 which ride along guide rail 75. As shown in FIG. 2, the opposite end of the carriage is supported on roller 71 which is rotatably mounted in the carriage and arranged to ride along rail 76, the rail being securely mounted in the machine frame. Similar to the lamp carriages, the lens carriage is also confined to move back and forth along a horizontal path of travel substantially parallel to the surface of platen 16.

Figure 3:
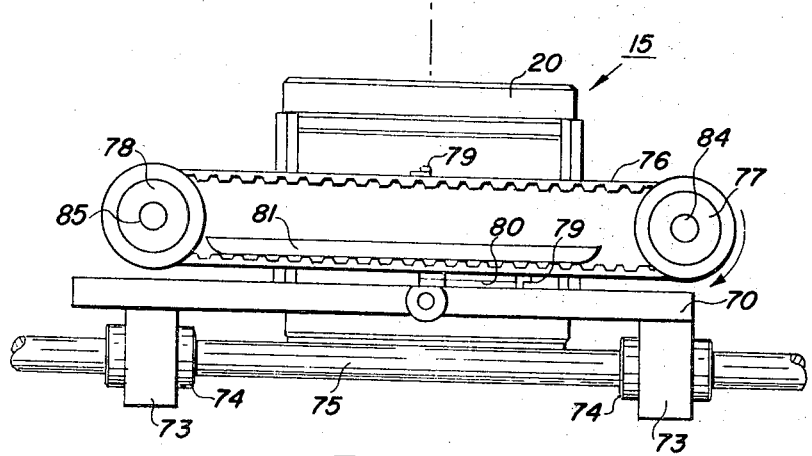
FIG. 3 is a front view of a movable lens assembly as shown in FIG. 1.

As shown in FIG. 3, the lens carriage is driven along the rails by means of a timing belt 76 mounted between timing pulleys 77 and 78 which are securely affixed to shafts 84 and 85, respectively. The shafts, in turn, are journaled for rotation in the machine frame. Driving lugs 79 are securely mounted on the outer periphery of the timing belt and positioned so as to engage in driving contact pad 80 mounted on the carriage during a scanning pass. As shown in FIG. 3, guide plate 81, mounted internal the belt loop, guides the timing belt during the lower portion of its travel to insure that the driving lugs and contact pad 80 remain in driving contact throughout the scanning pass. The center distance between shafts 84 and 85 determine the distance scanned by the lens element during the scanning cycle. In this particular case the shafts are positioned symmetrically about the center line of the platen at a distance sufficient to enable the lens element to scan across the entire platen during the scanning pass.

In operation, driving lug 79, being driven in the direction indicated, is caused to pass over timing pulley 77 (FIG. 3) so that it engages in driving contact pad 80. As the belt continues to move in the direction indicated the lens carriage, and thus the associated lens element, is driven in a horizontal direction along the rails so as to scan an original document supported upon platen 16.

At the end of the scanning cycle, lug 79 is caused to ride up over drive pulley 78 (FIG. 3) thus releasing the lens carriage. Upon release, the lens carriage is rapidly returned once again to a starting position, this latter operation herein referred to as the return cycle. The amount of time consumed in the return operation is wasted machine time and therefore it is desirous to minimize this time in high speed devices.

To effect a high speed return of the lens element, there is provided a flat coil spring 90 encircling the hub of spring arbor 91 which is locked in place in the machine frame. The return spring is secured at one end to the arbor 91 and at the other end to the lens carriage 70 by means of studs or the like. The spring is in a normal expanded condition when the lens carriage is at a start of scan position. When the lens is driven to the end of scan position, the spring is contracted so that sufficient energy is stored therein to effect a rapid return of the lens assembly to its original starting position when the carriage is released by driving lug 79.

The motion of the lens carriage during the return cycle is controlled by means of control cam 96. As shown in FIGS. 1 and 2, cam 96 is mounted on shaft 100 which is rotatably supported in machine frames 101 and 102. Cam shaft 100 and drive shaft 84 are arranged to move in timed relationship with each other through means of timing belt 103 acting through associated timing pulleys 104 and 105, respectively. The working face of the cam is designed so that cam follower arm 97, which is biased into communication with the cam by means of spring 98 (FIG. 1), follows the lens carriage during the scanning cycle. That is, the motion of follower arm 97 and the motion of the lens carriage are correlated through the cam system so that cam follower arm 97 follows along behind roller 99 during the scanning portion of the copying cycle. However, when the carriage is released at the termination of the scanning pass the rapid return of the lens carriage, due to the biasing effect of spring 90, is interrupted by cam follower arm 97 arresting roller 99.

Once arrested, the motion of the lens carriage during the return cycle is controlled by the cam and cam follower system. The cam face is designed to allow a controlled rapid deceleration of the lamp carriage during the terminal portion of the return cycle. The deceleration, though rapid, is over a sufficient period of time to dampen out unwanted vibrations which would ordinarily be produced by a sudden stopping of the assembly when the lens returns to its original starting position.

Figure 4:
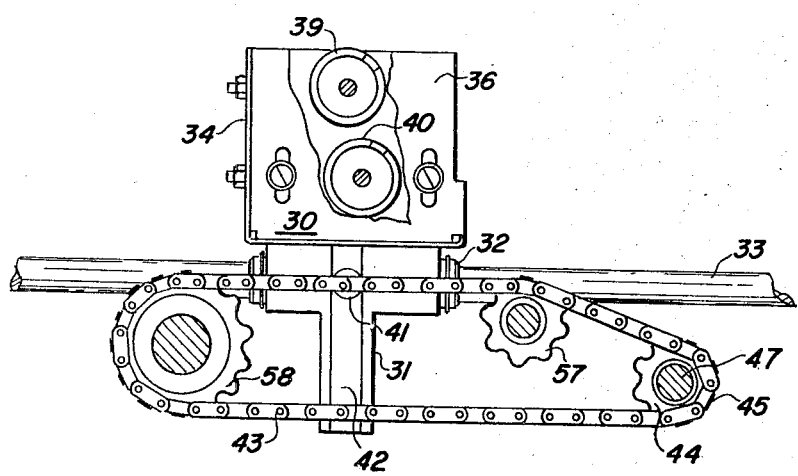
FIG. 4 is a front view of the movable lamps assembly shown in FIG. 1.

As noted, the individual lamp carriages are confined to a horizontal path of travel which is substantially parallel to the plane of the surface of platen 16. In actual operation, the two lamp carriages are driven in timed relation with the lens assembly and drum surface by means of timing belt 46 (FIG. 1). Driving power to the belt is provided by motor means 52 acting through drive shaft 53 to which is rigidly affixed driving timing pulley 54. Timing belt 46 is caused to pass over the two driving pulleys 47 associated with the two lamp assemblies, the pulleys being locked to the same drive shaft as are the light assembly drive sprockets 44 (FIG. 4). Drive sprockets 44 are arranged to engage in driving contact drive chain 43 associated with the individual lamp assemblies so as to drive the chain at the same linear velocity as the drum surface.

The horizontal velocity of the individual lamp carriages translated through the system, because of the arrangement of the drive and idler sprockets associated therewith, varies proportionally to the tangential slope of the chain with the horizontal plane. That is, the drive pin riding in the slot provided in T-shaped member 31 moves up or down, as the case may be, along the inclined path of travel as the chain moves between drive sprocket 44 and idler sprocket 57. This change in the vertical position of the drive pin is reflected in a change in the horizontal velocity of the lamp carriage. As shown in FIG. 1, a tensioning roll 49 rides on the outer periphery of belt 46 and serves the two-fold function of maintaining proper tension on the timing belt and also holds the timing belt in contact over a sufficient amount of arc with timing pulley 47 associated with lamp assembly 18 to insure proper driving engagement.

Drive motor 52 is also employed to supply driving power to the lens carriage assembly. It is shown in FIGS. 1 and 2, timing pulley 51 is keyed to shaft 53 which in turn is driven by motor means 52. Driving power is transmitted through timing belt 55 to drive pulley 59 which is locked to shaft 84 of the lens drive system. By proper selection of the timing pulleys, the linear speeds of the lens drive belt 76 and drive chains 43 associated with the lamp carriages are maintained at a two-to-one ratio required in a one-to-one optical scanning system as herein disclosed. That is, the driving chain associated with the lamp carriages will be moved at the same periphery as the speed of the xerographic drum while the peripheral speed of the lens element positioned midway therebetween is one half the peripheral speed of the drum.

Actually, in operation, the peak illumination produced by each source increases as the light sources move toward each other. If the lens element moved in fixed synchronization with the lamps during a scanning pass, the areas on the original projected by the lens would be illuminated by varying degrees of light intensity. The latent image so formed on the photoconductive drums consequently would be of extremely poor quality.

In actual practice, the two individual lamp assemblies are arranged so that their individual paths of travel are 180° out of phase with respect to each other. That is, the drive pin associated with one assembly will be moving toward an extended position along the bottom portion of the chain's path of travel while the drive pin associated with the other assembly is being moved along the upper portion of its respective path of travel. As can be seen, this arrangement causes the horizontal velocity of one carriage to fall off as it moves from its starting position towards the extended position while the horizontal velocity of the other carriage increases as it moves back from its extended position towards the starting position.

By proper arrangement of the various timing belts and associated pulleys, the lens assembly and the two lamp assemblies begin a scanning cycle at the same time. At the beginning of a scanning cycle, the lens carriage and the lamp carriage associated with the lens assembly leave their respective starting positions and travel in timed relation towards the center of the platen. The lens element projects successive elemental areas of illumination produced on the copy positioned on platen 16 onto the drum surface through slot aperture 25 to form a flowing image thereon.

Ordinarily, in a one-to-one optical scanning system, the lamps are arranged to move at twice the linear speed of the lens during the scanning cycle. However, in this particular arrangement, as the lamps mounted in the two individual lamp assemblies approach each other the total illumination produced at the platen increases inversely as the distance between the two light sources decreases. In the present invention, the linear velocity of the lamp carriages are allowed to fall off in relation to the lens so that the lamps actually "slip" in relation to the lens element. This slip is, as will be explained below, produced at a controlled rate to offset the increased intensity produced by the interaction of the lamp carriages as they approach each other.

Because the lamp assemblies are arranged symmetrically about the center line of the platen the carriages, as they move towards and away from each other, produce illumination patterns on the platen which are mirror images of each other. The total illumination and the distribution thereof seen by the lens element during the first half of the scanning cycle is therefore a mirror image of that seen by the lens during the second half of the scanning cycle.

A slit aperture 25 (FIG. 1) is positioned in close proximity to the drum surface and is arranged to pass illumithe case of slit projection systems, it is important that uniform lighting be produced during the scanning cycle. Although not shown, it is desirous to have a light shield capable of blocking extraneous light from the system so that only reflected light from the copy is projected through the slit aperture onto the drum surface. It is a natural phenomena in a slit scan optical system to produce higher intensity of illumination at the center of the original than at the edge due to the geometry of the system and the vignetism of the lens. The amount of illumination striking a moving surface transverse to the path of travel can be controlled by varying the size of the slit aperture. Slit apertures which are wider at both ends and tapering proportionally toward the center in hour glass configuration are known in the art. Such slits, when designed properly, effectively control the amount of illumination passed in one direction. However, it has long been a problem in moving optical scanning systems to produce a uniformity of illumination in the direction of travel.

FIGS. 5-8 are graphic representations of the illumination distribution produced by the dual carriage system of the present invention measured at the platen surface.

Figure 5:
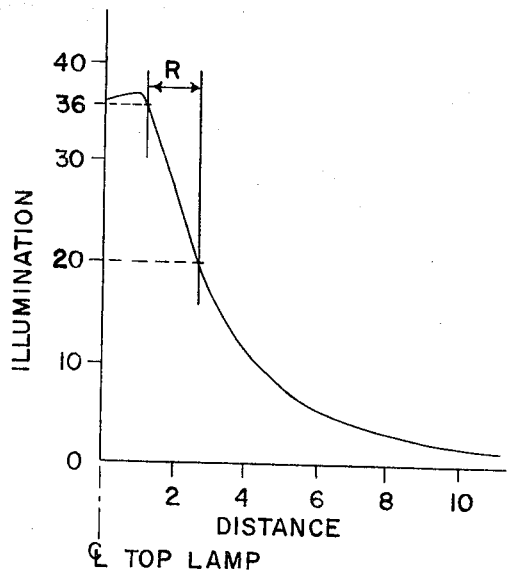
FIGS. 5 through 8 are graphic illustrations of light intensity plotted against the distance from a single light source showing the illumination distribution resulting from interaction of the two light sources when placed at various positions in relation to each other.

FIG. 5 shows an illumination distribution curve produced by the system when the lamp carriages are positioned in their respective starting positions at opposite ends of the platen. At this time the lens element is positioned so that it sees, primarily, the illumination produced by the lamps associated with lamp assembly 17. The ordinate of this graph represents the intensity of illumination while the abscissa represents the distance from the center line of the top lamp 39 (FIG. 4) mounted in the lamp carriage. Although, in this particular case, the units of distance and intensity are arbitrary, it should be clear that the illumination distribution curves are representative of the illumination distribution produced for various parameters and the teachings, as herein disclosed, are applicable to any dual lamp carriage systems of this type.

As noted, the apertures of the lamps are focused at the same point on the platen surface slightly ahead of the lamp carriages, and thus, the peak illumination point on the distribution curves occurs somewhat forward of the center line of the upper lamp, in this case approximately 0.5 unit. The area designated as area R on the curve represents that portion of the total illumination that is projected onto the drum through slit aperure 25 when the lens and the lamp carriages are in their respective starting positions. The center distance between the two individual lamp carriages at this time is sufficiently great so that the illumination produced by one light source does not effect the illumination output produced by the other. It should be noted that at the starting time the distribution curve in the working or R zone approximates a straight line on the curve between 36 units to 20 units. It should be further noted that the intensity of the light produced by the individual lamp carriages falls off rapidly at this time from the peak intensity point as you move toward the center of the platen. This rapid decrease in the light intensity indicates that there is no interaction between the individual lamp carriages. For all practical purposes, little illumination is produced by the aperture lamps any great distance from the point where they are directed.

Figure 6:
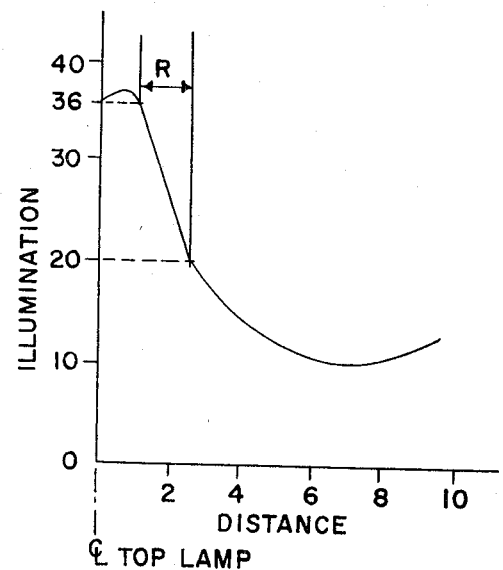

As the individual lamp assemblies and the lens carriage move from their respective starting positions towards the center of the platen, a point is reached where the illumination distribution seen by the lens element begins to change from that shown in FIG. 5. This is the point where the illumination distribution of one light source, due to the close proximity of the other, begins to change. FIG. 6 is a graphic illustration of this effect. It will be noted that the outer extremities of the illumination curve, that is, the intensity of illumination furthest away from the center line of the topmost lamp begins to slope upwardly first. The intensity of the illumination at this outer portion of the curve starts to rise as this area of illumination comes under the influence of the opposite light source first. It should also be noted that the linear, or working portion of the curve in the R zone remains relatively constant during this initial interaction phase. Because the linear portion of the curve in the R zone remains constant, the relation between the light source associated with lamp assembly 17 and the lens element can be held constant to produce uniform illumination at the platen.

Figure 7:
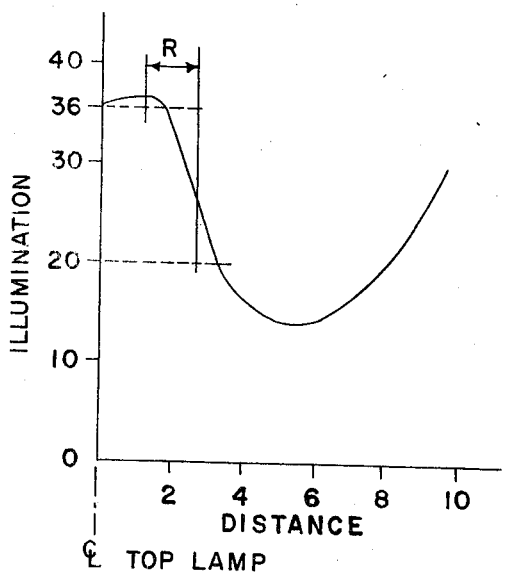
Figure 8:
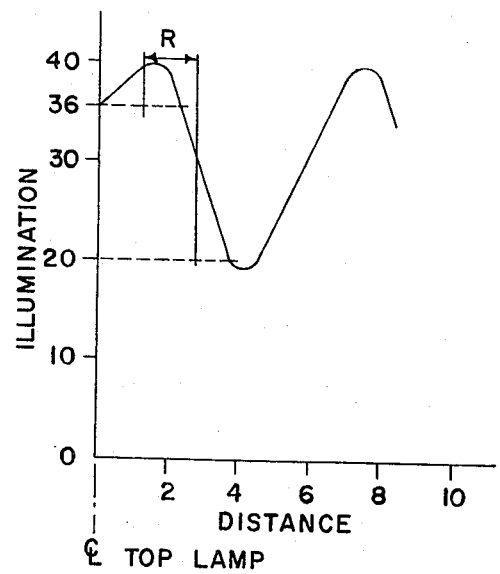

A point, however, is finally reached where the interaction of the two individual light sources on the illumination distribution is such to effect the intensity of illumination in the linear, or working, zone. This effect is shown in FIG. 7. Note that the peak intensity begins to rise and the intensity in the original R zone increases proportionally. Despite this change in illumination distribution, there still remains a fairly linear portion on the surface of the curve which is between 36 and 20 units of illumination that is capable of being projected through the slot aperture onto the drum surface to produce uniform intensity. However, this linear working area has moved into the region to the right of the R region shown on the curves.

In the present invention, the lamp carriage associated with lamp assembly 17 is allowed to slip at a predetermined rate in relation to the lens element so that lens element continually projects uniform illumination found on the linear portion of the curve as the distribution of illumination at the platen is changing. The desired slippage is produced by inclining the path of travel of chain 43 at some desired angle from the horizontal which results in a retardation of the horizontal velocity of the associated lamp carriage. The moving lens element continues to move at a constant velocity so that the distance between the center line of the uppermost lamp in the lamp carriage and the lens element increases at the desired rate which continually repositions the lens in relation to the illumination intensity shift. As can be seen, controlling the angle of inclination of the chain will in effect control the amount of slippage so that the lens element will continue to work on the linear portion of the curve in an area between 36 and 20 units.

A point is finally reached where the illumination distribution produced by the two interacting light sources becomes maximized for any given arrangement. This condition is graphically represented in FIG. 8. It should be noted that the low point on the resulting illumination distribution curve has reached an intensity equal to the intensity at the low point desired on the linear working portion of the curve, i.e. 20 units. In other words, a point is finally reached for any system where lamps cannot be slipped any further in relation to the lens element. When this condition is reached, the movement of the lamps towards each other is terminated and the lamps begin to move back towards their original starting positions. In the arrangement shown in FIG. 1, the fully extended positions for the lamp carriages physically results when the drive pin associated with lamp assembly 17 has moved fully down the inclined portion of chain 43 and starts to move back along the linear bottom portion of the chain's path of travel. At this time, the drive pin 41 associated with lamp assembly 18 has ridden up over drive sprocket 44 and starts up the inclined portion of the associated chain's path of travel.

When the carriages have reached their fully extended position, the lens element, which is traversing a path of travel across platen 16 rapidly transitions from the illumination distribution produced by the lamp carriage associated with lamp assembly 17 to the illumination distribution produced by the lamp carriage associated with assembly 18. However, as previously noted, because the lamp assemblies are symmetrically positioned about the center line of the system and are 180° out of phase in relation to the motion produced, the distribution of illumination which the lens element sees during the second half of a scanning pass is the same as herein described for the first half of the scanning cycle. In other words after the lens passes through this transition zone, it begins to recover the slippage given up during the first half of the scanning cycle. The distance between the center line of the uppermost lamp in the lamp carriage associated with assembly 18 and the lens element closes at the same rate that slippage was produced during the first half of the cycle. The lens is allowed, in a sense, to recover or catch up with the second lamp carriage until a constant velocity relationship is once again established between the lens and the lamps.

As can be seen, by proper selection of lamps and controlling the amount or rate of slip between the lens and light source, a system can be designed in accordance to the teachings herein disclosed which is capable of illuminating an object with uniform intensity so that a flowing image of high resolution is produced on a moving photosensitive surface. Furthermore, because the lamp starts and ends a scanning pass at the same position, the need to rapidly return the lamp is eliminated thus reducing vibrations in the present apparatus to level insufficient to disturb the xerographic processes.

While the invention has been described with reference to the structure disclosed herein, it is not confined to the details set forth, and this application is intended to cover such modifications or changes as may come within the purposes of the improvements or the scope of the following claims.

What is claimed is:

1. Apparatus for projecting a flowing light image onto a moving light receiving surface of the type wherein an original is supported in a plane upon a support platen and a lens element being arranged to focus light reflected from said original onto the light receiving surface is moved across the platen at a predetermined scanning rate relative to the speed of the moving light receiving surface wherein a flowing image of the stationary original is produced on the moving light receiving surface the improvement comprising:

a first source of illumination positioned at one end of the support platen for illuminating a longitudinal section of elemental width on said platen surface and being arranged to move in a path of travel transverse to the surface of the platen, a second source of illumination positioned at the opposite end of said platen for illuminating a longitudinal section of elemental width on the surface of said platen and being arranged to move in the same path of travel as said first illumination source, and means to drive said first and said second source of illumination towards and then away from each other along said common path of travel as the lens element scans across the platen wherein the lens projects successive increments of reflected illumination produced by said sources onto the light receiving surface.

2. The apparatus of claim 1 wherein the lens element precedes said first source of illumination in the direction of scan for the first half of the scanning pass and follows said second source of illumination for the remainder of the scanning pass.

3. The apparatus of claim 2 having further means to rapidly restore said lens element to its original starting position at a rate greater than said scanning rate.

4. Apparatus for projecting a flowing light image onto a moving light receiving surface of the type wherein an original is supported in a plane upon a support platen and a lens element being arranged to focus light reflected from said original through an aperture onto said light receiving surface is moved across the platen at a rate relative to the speed of the light receiving surface wherein a flowing light image of the stationary original is produced on the moving light receiving surface, the improvement comprising:

means to move said lens element in a plane parallel to the plane of said platen at a constant rate wherein an original supported thereon is scanned, a first and second elongated sources of illumination interposed between the platen and the lens being arranged to produce individual bands of peak illumination upon the platen surface extending transverse to the direction of lens travel, means to move said first and second sources of illumination along a common path of travel from opposite ends of said platen towards and then away from each other as the lens element scans across said platen wherein said lens precedes said first source of illumination in the direction of scan for the first half of the scanning pass and follows the second source of illumination for the second half of the scanning pass, and control means to regulate the rate at which said first and second source of illumination moves towards and then away from each other wherein the lens element projects successive incremental areas of constant illumination on the moving light receiving surface.

5. The apparatus of claim 4 having further means to restore said lens element to its original starting position at a rate greater than the scanning rate.

6. The apparatus of claim 5 wherein both said first and said second source of illumination each include at least one elongated aperture lamp being arranged to direct a band of illumination on the surface of the platen in a direction towards the opposite light source.

References Cited

UNITED STATES PATENTS

| | | | |
|---|---|---|---|
| 3,062,108 | 11/1962 | Mayo | 355—11 X |
| 3,301,126 | 1/1967 | Osborne | 355—8 X |

JOHN M. HORAN, Primary Examiner

U.S. Cl. X.R.

355—8